United States Patent [19]

Moriyama et al.

[11] Patent Number: 4,903,066
[45] Date of Patent: Feb. 20, 1990

[54] OPTICAL SYSTEM FOR FOCUS STATE DETECTION

[75] Inventors: Keiji Moriyama, Yokohama; Hiroshi Ohki, Setagaya, both of Japan

[73] Assignee: Nikon Corporation, Tokyo, Japan

[21] Appl. No.: 317,468

[22] Filed: Mar. 1, 1989

[30] Foreign Application Priority Data

Mar. 4, 1988 [JP] Japan .................................. 63-51311

[51] Int. Cl.[4] ............................ G03B 3/00; G01J 1/20
[52] U.S. Cl. ...................................... 354/406; 250/201
[58] Field of Search ................ 354/402, 406, 407, 408; 250/201 PF, 204

[56] References Cited

U.S. PATENT DOCUMENTS 4,699,493 10/1987 Koyama et al. ..................... 354/406

FOREIGN PATENT DOCUMENTS 59-75209 4/1984 Japan .
60-32012 2/1985 Japan .
62-25715 2/1987 Japan .

Primary Examiner—W. B. Perkey
Attorney, Agent, or Firm—Shapiro and Shapiro

[57] ABSTRACT

A focus state detecting optical system is provided with a condenser lens positioned in the vicinity of or behind a primary image formed by the light coming from an object and transmitted by an objective lens, pupil dividing means positioned behind the condenser lens and adapted for dividing the pupil of the condenser lens symmetrically with respect to the optical axis, and re-imaging lenses positioned parallel to and corresponding to thus divided pupils and symmetrically with respect to the optical axis thereby forming secondary images, wherein the focus state is detected from the relative positional aberration of said secondary images. Each of the re-imaging lenses is composed of a positive lens with two convex faces of which at least one is an aspherical shape.

16 Claims, 3 Drawing Sheets

OPTICAL SYSTEM FOR FOCUS STATE DETECTION

BACKGROUND OF THE INVENTION

1. Field of the Invention

The present invention relates to a focus state detecting optical system, for detecting the focus state of an objective lens by means of the light coming from an object and transmitted by said objective lens.

2. Related Background Art

There have already been made various proposals on an optical system, for detecting the focus state of a photographing lens, to be placed behind a primary image formed by said photographing lens thereby re-forming said primary image as mutually similar two secondary images, wherein said focus state is determined from the positional aberration of said two images.

For example, the Japanese Laid-open Patent Application Nos. 59-75209 and 60-32012 propose to provide an aspherical condenser lens in the vicinity of or behind the plane of primary image of the photographing lens, thereby realizing uniform distribution of light quantity reaching the sensors and correcting the distortion aberration.

Also the U.S. Pat. No. 4,699,493 proposed to improve the symmetric nature of the secondary image plane by deviating each central axis of a pair of diaphragms serving as the pupil dividing means from each optical axis of a pair of imaging lenses for forming the secondary images on the sensors, or by providing a face of prism function on said imaging lens.

The two secondary images, formed at the position of sensors for detecting the focus state, have to be of symmetrical properties, with respect to a point on each sensor, corresponding to the central point of an effective area (hereinafter called distance measuring area) on the primary image plane of the photographic lens.

However, the technologies disclosed in said Japanese Laid-open Patent Application Nos. 59-75209 and 60-32012 cannot be considered to provide sufficient correction on the symmetric and imaging properties of the secondary images formed on said sensors.

In order that the focus state can be detected with a constant accuracy regardless of the position of the images on said secondary image plane, the symmetric properties alone of the secondary images formed on said sensors are not sufficient, but there are required uniform and satisfactory imaging properties on said secondary images.

In order to attain such imaging properties, it is necessary to correct the curvature of image plane of the meridional image plane (hereinafter called a curvature of image plane) along the direction of arrangement of the sensors.

However, in the technology disclosed in the U.S. Pat. No. 4,699,493, there still remains a curvature of the image plane, so that the unevenness of the image cannot be sufficiently corrected. More specifically, since the central portion and the peripheral portion of the distance measuring area show considerably different imaging properties on the secondary image plane, the accuracy of distance measurement with the sensors cannot be uniform.

In order to resolve such drawbacks, the Japanese Laid-open Patent Application No. 62-25715 proposes to provide an auxiliary lens, coaxial with the condenser lens, at the object side of the dividing optical system, but the increase in the number of optical members will result in additional difficulties such as the additional adjustment required in the manufacture or the increased cost.

On the other hand, if the distance measuring area is enlarged by increasing the image (reducing) magnification of the secondary images, the symmetric and imaging properties of said images become more critical.

SUMMARY OF THE INVENTION

In consideration of the foregoing, the object of the present invention is to provide a focus state detecting optical system of a high reducing magnification capable of correcting the image plane curvature of the images formed on the sensors and maintaining symmetry and satisfactory and uniform imaging properties in said images, with a simple optical structure.

The above-mentioned object can be achieved, according to the present invention, by a focus state detecting optical system provided with a condenser lens positioned in the vicinity of or behind a primary image formed by the light coming from an object and transmitted by an objective lens; pupil dividing means positioned behind said condenser lens and adapted for dividing the pupil of said condenser lens symmetrically with respect to the optical axis; and re-imaging lenses positioned parallel to and corresponding to thus divided pupils and symmetrically with respect to the optical axis thereby forming secondary images, wherein the focus state is detected from the relative positional aberration of said secondary images; said optical system being characterized by a fact that each of said re-imaging lenses is composed of a positive lens with two convex faces of which at least one is an aspherical shape.

DESCRIPTION OF THE PREFERRED EMBODIMENTS

Figure 1:
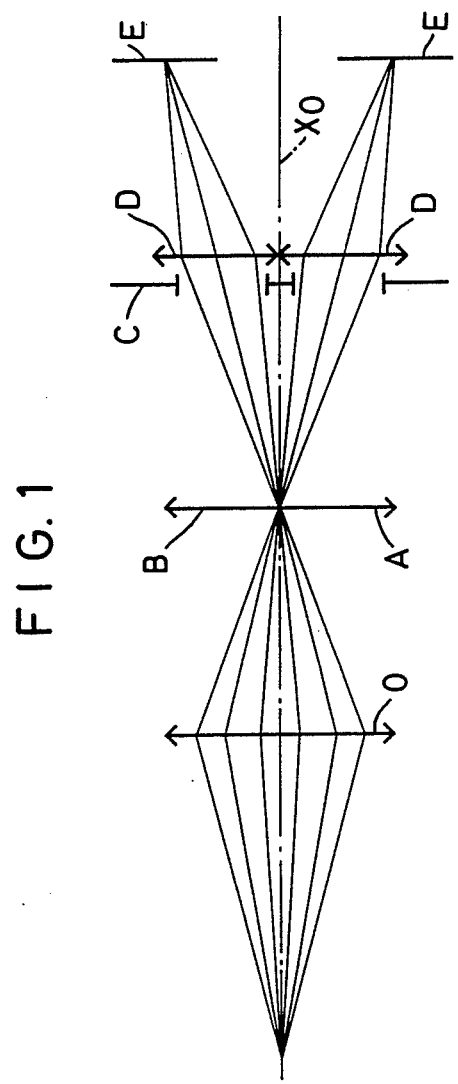
FIG. 1 is a schematic view showing the principle of the optical system of the present invention.

Now the present invention will be clarified in detail with reference to FIG. 1 showing the principle of the optical system of the present invention. Said optical system is composed of a condenser lens B positioned in the vicinity of or behind an image plane A of a primary image formed by the light coming from an object and transmitted through a photographic lens 0; a diaphragm C constituting pupil dividing means with a pair of apertures symmetrical to the optical axis $X_0$ (hereinafter called main optical axis) and positioned conjugate to the pupil of the photographing lens with respect to said condenser lens or in the vicinity of said conjugate position; and a pair of re-imaging lenses D of a positive refractive power, positioned behind said diaphragm C symmetrically with respect to the main optical axis $X_0$ so as to respectively correspond to the paired apertures. Each of the re-imaging lens D of the present invention is provided with convex faces to enable elimination of asymmetry in the meriodinal image plane resulting from the optical structure such as the condenser lens. In order to prevent the problems of adjustment in the manufacture and cost, the paired re-imaging lenses D positioned symmetrically with respect to the main optical axis $X_0$ are preferably formed integrally with a single member.

In the above-explained structure, the light flux from the exit pupil of the photographing lens O is focused on the primary image plane A, and is further transmitted by the condenser lens B and the apertures of the diaphragm C, whereby the exit pupil of said photographing lens is divided into essentially two areas to form two light fluxes, which form, through biconvex re-imaging lenses D, two secondary images on an image plane E. Said two secondary images are photoelectrically converted by sensors positioned along said two image planes E, and the focus state can be detected from the relative positional aberration of said secondary images.

In the following the present invention will be further detailed, with reference to FIG. 2, which is a light path chart showing the principle of generation of aberration by the re-imaging lens D. The lens D in this case has an integral structure of a pair of biconvex lenses positioned symmetrically with respect to the main optical axis $X_0$.

Figure 2:
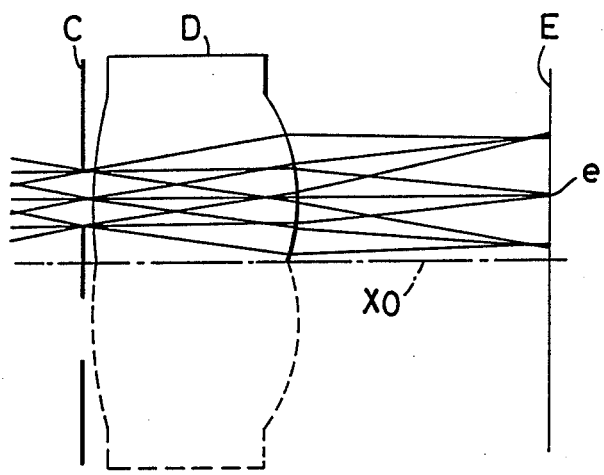
FIG. 2 is an optical path chart showing the principle of generation of aberration by an imaging lens D.
Figure 5:
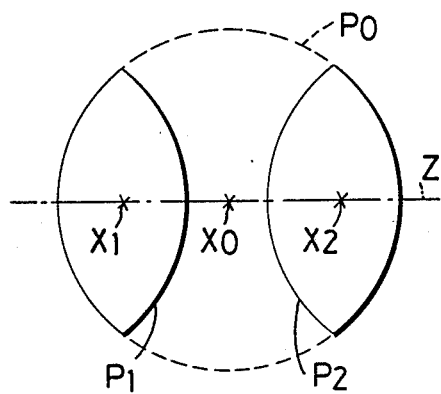
FIG. 5 is a chart showing astigmatism based on FIG. 2.

As will be understood from the optical path chart shown in FIG. 2, the elimination of the asymmetry of said secondary images on the meriodinal image plane along does not correct the curvature of the image plane, and optimum image plane is difficult to maintain because of significant astigmatism symmetric to a point e on the secondary image plane, corresponding to the central point of the distance measuring area. As shown in an astigmatism chart shown in FIG. 5, there exists a large image plane curvature, wherein M and S respectively stand for meridional image plane and sagittal image plane. Consequently there is generated difference in the imaging properties between the area of the sensors corresponding to the central portion and peripheral portion of the distance measuring area, and it is difficult to attain uniform imaging properties.

In order to satisfactorily correct the image plane curvature which is the cause of deteriorated imaging properties on the sensors, the re-imaging lens D of the present invention is given an aspherical structure symmetric with respect to the main optical axis of each lens.

The focus state detecting optical system of the present invention is basically composed of positive lens components only, so that there is generated an image plane curvature generally in the negative direction. The aspherical shape for correcting such curvature has to have a weaker refractive power in the peripheral portion than in the central portion.

The aspherical shape of the re-imaging lens is represented by:

$$\Delta_D = Ch^2/(1 + \sqrt{1 - kh^2C^2}), C = 1/r$$

wherein h is the vertical height from the optical axis of a biconvex lens to the main optical axis $X_0$, k is the conical constant, r is the standard radius of curvature of said biconvex lens on the optical axis thereof, and $\Delta_D$ is a distance, along the optical axis, from a tangential plane at the crossing point between said optical axis and the aspherical face of the biconvex lens to the point on said aspherical face at the height h. Said aspherical shape is preferably adopted on a face of the re-imaging lens at the secondary image side, which is particularly effective for the correction of image plane curvature.

The slope of said face has to be gradually reduced from the central portion of the face toward the peripheral portion, but an excessively low refractive power at the peripheral portion may result in a positive image plane curvature. It is therefore necessary to balance the refractive power with the distortion aberration.

For this reason the aspherical shape is preferably provided with a conical constant in the following range:

$$-3.0 < k < 1.0$$

Above the upper limit of said range, the negative image plane curvature in the image formed on the sensor cannot be completely corrected. On the other hand, below the lower limit of said range, said negative image plane curvature is excessively corrected to result in a positive image plane curvature. Consequently, in either case, the imaging properties on the sensor are different between the portions corresponding to the central and peripheral areas of the distance measuring area, so that the accuracy of distance measurement cannot be made uniform.

According to the present invention, the use of an aspherical face satisfying the above-explained conditions satisfactorily correct the image plane curvature, thereby realizing a uniform image plane and a uniform distance measuring accuracy.

Figure 3:
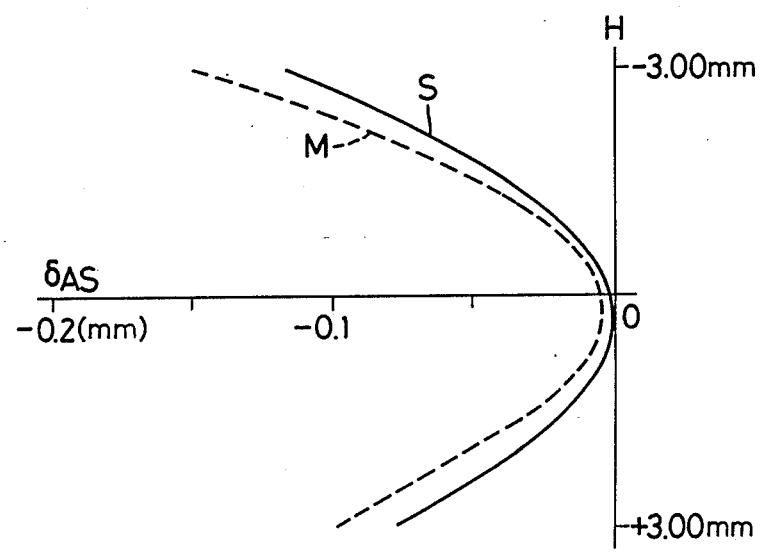
FIG. 3 is a schematic view of an optical system embodying the present invention.

The focus state detecting optical system of the present invention is positioned at or in the vicinity of the primary image plane which is the estimated focal plane of the photographing lens. Reference is now made to FIG. 3 showing the basic structure of the focus state detecting optical system embodying the present invention.

Said optical system is composed of an aspherical condenser lens B positioned behind a primary image plane A formed by an unrepresented photographing lens; a diaphragm C having a pair of apertures symmetrical with respect to the main optical axis $X_0$ and placed at a position conjugate with the pupil of the photographing lens with respect to the condenser lens or in the vicinity thereof; and an imaging lens D consisting of integrally constructed two aspherical biconvex lenses which are positioned symmetrically with respect to the main optical axis $X_0$, respectively corresponding to said apertures.

Sensors are provided at the image plane E of two secondary images formed by the light coming from the object and transmitted by said unrepresented photographing lens and the above-explained focus state detecting optical system, and are used for photoelectric conversion of said two secondary images, and the focus state is detected from the relative positional aberration of said secondary images.

In each of the embodiments of the present invention, said condenser means B has an aspherical form, thereby realizing uniform distribution of the light quantity reaching the sensors on which said secondary images are formed.

Figure 4:
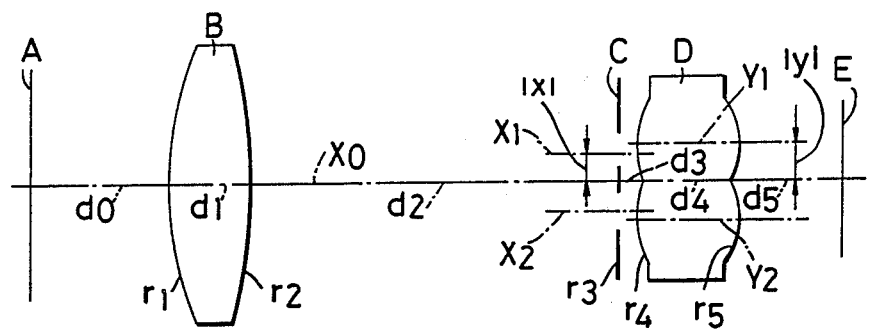
FIG. 4 is a view of a diaphragm C employed in the present invention.

The diaphragm C employed in the present invention is constructed as shown in FIG. 4. Each of the apertures P1, P2 of same size has a leaf shape symmetrical to the central axis X1 or X2, and the external peripheries of said apertures P1, P2 are formed along the circle of the pupil P0, representing the practical dimension of the exit pupil of the photographing lens. In order that the pupil is divided symmetrically to the main optical axis $X_0$ by said apertures P1, P2, the central axes X1, X2 thereof are positioned on a line Z passing through the main optical axis $X_0$ and corresponding to the direction of arrangement of the sensors, and symmetrically with respect to the main optical axis $X_0$. Consequently it is possible, by the structure of said diaphragm C, to further effectively stabilize the distribution of the light quantity reaching the sensors. The apertures of the diaphragm may be circular or of a combination of circular shape and leaf shape.

The enlargement of the distance measuring area is generally not effective enough, because two secondary images formed on the sensors E exceed the main optical axis $X_0$ and mutually overlap. In the embodiments of the present invention, in order to prevent such overlapping of the secondary images, the optical axes Y1, Y2 of the imaging lens D are deviated respectively from the axes X1, X2 of the apertures of the diaphragm C, farther away from the main optical axis $X_0$.

In the following, lens data of first to fifth embodiments are summarized in Tabs. 1 to 5, wherein r is the radius of curvature, d is the distance between lens faces, n is the refractive index for d line ($\lambda = 587.6$ nm), and * indicates an aspherical surface. Also A, B, C and D stand for the primary image plane, condenser lens, diaphragm and imaging lens, respectively.

The aspherical surface employed in the condenser lens B is represented by:

$$\Delta_B = \{Ch^2/(1 + \sqrt{1 - Kh^2C^2})\} + A_1h^2 + A_2h^4 + A_3h^6,$$

$$C = 1/r$$

wherein r is the reference radius of curvature, K is the conical constant, $A_n$ is the aspherical coefficient of n-th order, h is the vertical height from the main optical axis, and $\Delta_B$ is the distance, along the optical axis $X_1$, from a tangential plane at the top of the aspherical surface to a position of height h on said aspherical surface.

Also $d_0$ is the distance from the primary image plane A to a surface $r_1$ of the condenser lens B at the object side, $|x|$ is the absolute vertical distance from the main optical axis $X_0$ to the axis $X_1$ or $X_2$ of each aperture of the diaphragm C, $|y|$ is the absolute vertical distance from the main optical axis to the axis $Y_1$ or $Y_2$ of each biconvex lens in the imaging lens, and $\oplus$ is the image reducing magnification of the secondary images formed by the focus state detecting optical system, with respect to the primary image formed by the photographing lens.

TABLE 1

(1st embodiment)

| No. | r | d | n | |
|---|---|---|---|---|
| *1 | 11.901 | 2.500 | 1.49108 | |
| 2 | −12.067 | 13.492 | | B |
| 3 | ∞ | 0.100 | | C |
| 4 | 9.199 | 2.300 | 1.49108 | |
| *5 | −1.724 | | | D |

$d_0 = 4.000$

1st face: conical constant K = 0
aspherical coefficients $A_1 = 0$, $A_2 = -0.26966 \times 10^{-3}$, $A_3 = -0.23211 \times 10^{-5}$
5th face: conical constant K = 0.47
$|x| = 0.682$, $|y| = 0.742$, $\beta = -0.252$

TABLE 2

(2nd embodiment)

| No. | r | d | n | |
|---|---|---|---|---|
| *1 | 12.077 | 2.500 | 1.53636 | |
| 2 | −15.518 | 13.991 | | B |
| 3 | ∞ | 0.100 | | C |
| 4 | 2.802 | 2.600 | 1.53636 | |
| *5 | −1.995 | | | D |

$d_0 = 4.230$

1st face: conical constant K = 0.50
aspherical coefficients $A_1 = 0$, $A_2 = -0.21280 \times 10^{-3}$, $A_3 = 0.25590 \times 10^{-6}$
5th face: conical constant K = −1.18
$|x| = 0.709$, $|y| = 0.790$, $\beta = -0.200$

TABLE 3

(3rd embodiment)

| No. | r | d | n | |
|---|---|---|---|---|
| *1 | 11.919 | 2.500 | 1.53636 | |
| 2 | −14.669 | 13.489 | | B |
| 3 | ∞ | 0.100 | | C |
| 4 | 3.181 | 2.700 | 1.53636 | |
| *5 | −2.047 | | | D |

$d_0 = 4.230$

1st face: conical constant K = 0.50
aspherical coefficients $A_1 = 0$, $A_2 = -0.23724 \times 10^{-3}$, $A_3 = 0.27373 \times 10^{-6}$
5th face: conical constant K = −0.68
$|x| = 0.684$, $|y| = 0.750$, $\beta = -0.220$

TABLE 4

(4th embodiment)

| No. | r | d | n | |
|---|---|---|---|---|
| 1 | 11.116 | 2.500 | 1.53636 | |
| *2 | −15.343 | 13.122 | | B |
| 3 | ∞ | 0.100 | | C |
| 4 | 4.341 | 2.700 | 1.53636 | |
| *5 | −2.126 | | | D |

$d_0 = 4.230$

2nd face: conical constant K = 1.20
aspherical coefficients $A_1 = 0$, $A_2 = 0.32270 \times 10^{-3}$, $A_3 = 0$
5th face: conical constant K = −0.12
$|x| = 0.669$, $|y| = 0.720$, $\beta = -0.250$

TABLE 5

(5th embodiment)

| No. | r | d | n | |
|---|---|---|---|---|
| *1 | 11.871 | 2.500 | 1.53636 | |
| 2 | −13.897 | 13.094 | | B |
| 3 | ∞ | 0.100 | | C |
| 4 | 3.941 | 2.800 | 1.53636 | |
| *5 | −2.161 | | | D |

$d_0 = 4.230$

1st face: conical constant K = −3.50
aspherical coefficients $A_1 = 0$, $A_2 = 0$, $A_3 = 0$
5th face: conical constant K = −0.30
$|x| = 0.664$, $|y| = 0.720$, $\beta = -0.250$ The astigmatism chart for each embodiment indicates the amount of aberration $\delta_{AS}$ on the secondary image plane, measured from a point thereon corresponding to the center of the distance measuring area, and corresponding to the image height H of the primary image measured from the main optical axis of the primary optical axis. Also the distortion aberration in each embodiment is converted from that on the secondary image plane into that in the distance measuring area on the primary image plane, in consideration of the image reducing magnification of the focus state detecting optical system. Since the image height H on the primary image plane measured from the main optical axis $x_0$ corresponds to the image height h on the secondary image plane measured from a point thereof corresponding to the center of the distance measuring area, the distortion at the image height H is represented by $$\delta_{Di}(H) = h/\beta - H$$

wherein $\beta$ is the reducing magnification of the focus state detecting optical system.

As will be apparent from the aberration charts, the image plane curvature and the distortion aberration of the secondary images are extremely satisfactorily corrected, so that high accurate detection of focus state is possible. In order to reduce the cost, the imaging lens D may be composed of integrally molded pair of plastic lenses.

The present invention provides a focus state detecting optical system capable of realizing a high reducing image magnification with a simple optical structure, and further capable of satisfactorily correcting the image plane curvature on the sensors on which secondary images are formed, and providing excellent symmetry of the image with respect to a point on the sensor corresponding to the center of the distance measuring area, thus achieving satisfactory and uniform imaging properties.

In the foregoing description, the pupil is divided into two because only one area on the object is used for focus state detection. If plural areas on the object are used for focus state detection, the pupil is to be divided into a number corresponding to twice of the number of said areas. Consequently the present invention is not limited to the division of the pupil into two.

What is claimed is:

1. A focus state detecting optical system for a camera, comprising:
   (a) a condenser lens positioned in the vicinity of or behind an image plane of a primary image of an object, formed by a photographing lens of said camera;
   (b) pupil dividing means positioned behind said condenser lens and adapted for dividing the pupil of the photographing lens of said camera into plural areas symmetrically with respect to the optical axis; and
   (c) a re-imaging optical system for forming secondary images of the object, composed integrally of plural positive biconvex lenses positioned in parallel manner respectively corresponding to said divided areas of the pupil and symmetrically with respect to the optical axis, wherein each of said plural positive biconvex lenses is provided, at the side of said secondary image, with an aspherical surface satisfying following conditions:

$$\Delta_D = Ch^2/(1 + \sqrt{1 - kh^2C^2}), C = 1/r, -3.0 < k < 1.0$$

wherein h is the vertical height of the optical axis of each of said plural positive biconvex lenses, k is the conical constant, r is the reference radius of curvature of each of said plural positive biconvex lenses, and $\Delta_D$ is the distance, in each of said plural positive biconvex lenses, from the tangential plane of said aspherical surface at the crossing point thereof with the optical axis to a point of said aspherical surface at said height h.

2. An optical system according to claim 1, wherein said pupil dividing means comprises a diaphragm with plural apertures.

3. An optical system according to claim 2, wherein the optical axis of each of said plural apertures is deviated from the optical axis of corresponding one of plural positive biconvex lenses 4. An optical system according to claim 3, wherein the optical axis of each of said plural positive biconvex lenses is positioned, with respect to the optical axis of the corresponding one of said plural apertures, opposite to the optical axis of said condenser lens.

5. A focus state detecting optical system for a camera, comprising:
   (a) a condenser lens positioned in the vicinity of or behind an image plane of a primary image of an object, formed by a photographing lens of said camera;
   (b) pupil dividing means positioned behind said condenser lens and adapted for dividing the pupil of the photographing lens of said camera into plural areas symmetrically with respect to the optical axis; and
   (c) a re-imaging optical system for forming secondary images of the object, composed integrally of plural positive biconvex lenses positioned in parallel manner respectively corresponding to said divided area of the pupil and symmetrically with respect to the optical axis, wherein each of said plural positive biconvex lenses is provided, at least in a face thereof, with an aspherical shape.

6. An optical system according to claim 5, wherein each of said plural biconvex lenses is provided with an aspherical shape in the face thereof at the side of said secondary image.

7. An optical system according to claim 6, wherein said pupil dividing means comprises a diaphragm with plural apertures.

8. A optical system according to claim 7, wherein the face, at the secondary image side, of each of said plural biconvex lenses is so formed that 9. An optical system according to claim 8, wherein the optical axis of each of said plural apertures is deviated from the optical axis of corresponding one of said plural positive biconvex lenses.

10. An optical system according to claim 9, wherein the optical axis of each of said plural positive biconvex lenses is positioned, with respect to the optical axis of the corresponding one of said plural apertures, opposite to the optical axis of said condenser lens.

11. A focus state detecting optical system for a camera, comprising
   (a) a condenser lens positioned in the vicinity of or behind an image plane of a primary image of an object, formed by a photographing lens of said camera;
   (b) pupil dividing means positioned behind said condenser lens and adapted for dividing the pupil of the photographing lens of said camera into plural areas symmetrically with respect to the optical axis; and
   a re-imaging optical system for forming secondary images of the object, composed integrally of plural positive lenses positioned in parallel manner respectively corresponding to said divided areas of the pupil and symmetrically with respect to the optical axis, wherein the face, at the secondary image side, of each of said plural positive lenses has an aspherical shape.

12. An optical system according to claim 11, wherein the face, at the secondary image side, of each of said plural positive lenses is so formed that the refractive power decreases as the distance from the optical axis of said each of the plural positive lenses increases.

13. An optical system according to claim 12, wherein each of said plural positive lenses is a biconvex lens.

14. An optical system according to claim 13, wherein said pupil dividing means comprises a diaphragm with plural apertures.

15. An optical system according to claim 14, wherein the optical axis of each of said plural apertures is deviated from the optical axis of corresponding one of said plural positive biconvex lenses 16. An optical system according to claim 15, wherein the optical axis of each of said plural positive biconvex lenses is positioned, with respect to the optical axis of the corresponding one of said plural apertures, opposite to the optical axis of said condenser lens.

* * * * *